(12) United States Patent
Salter et al.

(10) Patent No.: US 9,193,301 B2
(45) Date of Patent: Nov. 24, 2015

(54) VEHICLE READING LAMP WITH LOW INTENSITY LIGHT SETTING

(71) Applicant: Ford Global Technologies, LLC, Dearborn, MI (US)

(72) Inventors: Stuart C. Salter, White Lake, MI (US); James J. Surman, Clinton Township, MI (US); Jeffrey Singer, Canton, MI (US); Matthew Majkowski, Dearborn, MI (US); Khaled Omar, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/257,309

(22) Filed: Apr. 21, 2014

(65) Prior Publication Data

US 2015/0298605 A1    Oct. 22, 2015

(51) Int. Cl.
*B60Q 3/02* (2006.01)
*H05B 33/08* (2006.01)
*B60Q 3/00* (2006.01)

(52) U.S. Cl.
CPC .............. *B60Q 3/0293* (2013.01); *B60Q 3/001* (2013.01); *B60Q 3/0243* (2013.01); *B60Q 3/0286* (2013.01); *H05B 33/0854* (2013.01); *H05B 33/0872* (2013.01)

(58) Field of Classification Search
CPC ........ B60Q 3/02; B60Q 3/0253; B60Q 3/0286
USPC ............... 315/76–77; 362/487–488, 490, 492
See application file for complete search history.

(56) References Cited

U.S. PATENT DOCUMENTS

| 7,207,702 | B2 | 4/2007 | Walser et al. | |
|---|---|---|---|---|
| 7,404,655 | B2 | 7/2008 | Walser et al. | |
| 8,425,093 | B2 | 4/2013 | Kino et al. | |
| 8,514,545 | B2 | 8/2013 | Haag | |
| 2010/0238677 | A1* | 9/2010 | de Laine et al. | B60Q 3/004 362/520 |
| 2011/0006684 | A1* | 1/2011 | Hodgson et al. | B60Q 3/005 315/77 |
| 2012/0286661 | A1* | 11/2012 | Salter et al. | B60Q 3/0293 315/77 |
| 2013/0271204 | A1* | 10/2013 | Salter et al. | H03K 17/94 327/517 |
| 2015/0138792 | A1* | 5/2015 | Salter et al. | B60Q 3/0209 362/510 |

* cited by examiner

*Primary Examiner* — Jason M Crawford
(74) *Attorney, Agent, or Firm* — Vichit Chea; Price Heneveld LLP

(57) ABSTRACT

A vehicle reading lamp is provided and includes an outer lens and a light source for illuminating an outer lens. A controller is included for prompting the light source to generate a low intensity light to assist a vehicle occupant in visually locating the reading lamp in dark conditions, wherein when the occupant desires task lighting and subsequently activates the light source, the controller prompts the light source to switch from the low intensity light to a high intensity light.

18 Claims, 5 Drawing Sheets

VEHICLE READING LAMP WITH LOW INTENSITY LIGHT SETTING

FIELD OF THE INVENTION

The present invention generally relates to vehicle lighting, and more particularly to vehicle reading lamps.

BACKGROUND OF THE INVENTION

Currently, some reading lamps require a user to interact with its outer lens in order to activate and deactivate the reading lamp. One downside to such a design is that a vehicle occupant typically has to rely on tactile sensations to locate the outer lens when dark conditions are present. As a result, some vehicle occupants may become distracted with having to feel for the position of the outer lens when desiring to activate the reading lamp. Therefore, there is a need for a reading lamp that allows a vehicle occupant to visually identify the location of the outer lens in dark conditions.

SUMMARY OF THE INVENTION

According to one aspect of the present invention, a reading lamp supported in a vehicle overhead console is provided. The reading lamp includes an outer lens, a proximity sensor disposed behind the outer lens, and a light source for illuminating the outer lens. A controller is included for prompting the light source to generate a low intensity light of a first color when a dark condition is detected and a high intensity light of a second color when the proximity sensor detects a signal change.

According to another aspect of the present invention, a vehicle reading lamp is provided and includes an outer lens and a light source for illuminating an outer lens. A controller is included for prompting the light source to generate a low intensity light to assist a vehicle occupant in visually locating the reading lamp in dark conditions, wherein when the occupant desires task lighting and subsequently activates the light source, the controller prompts the light source to switch from the low intensity light to a high intensity light.

According to a further aspect of the present invention, a method of controlling a vehicle reading lamp is provided. The method includes the steps of prompting a light source to generate a low intensity light to assist a vehicle occupant in locating the reading lamp in dark conditions and prompting the light source to switch from the low intensity light to a high intensity light when the occupant activates the light source.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
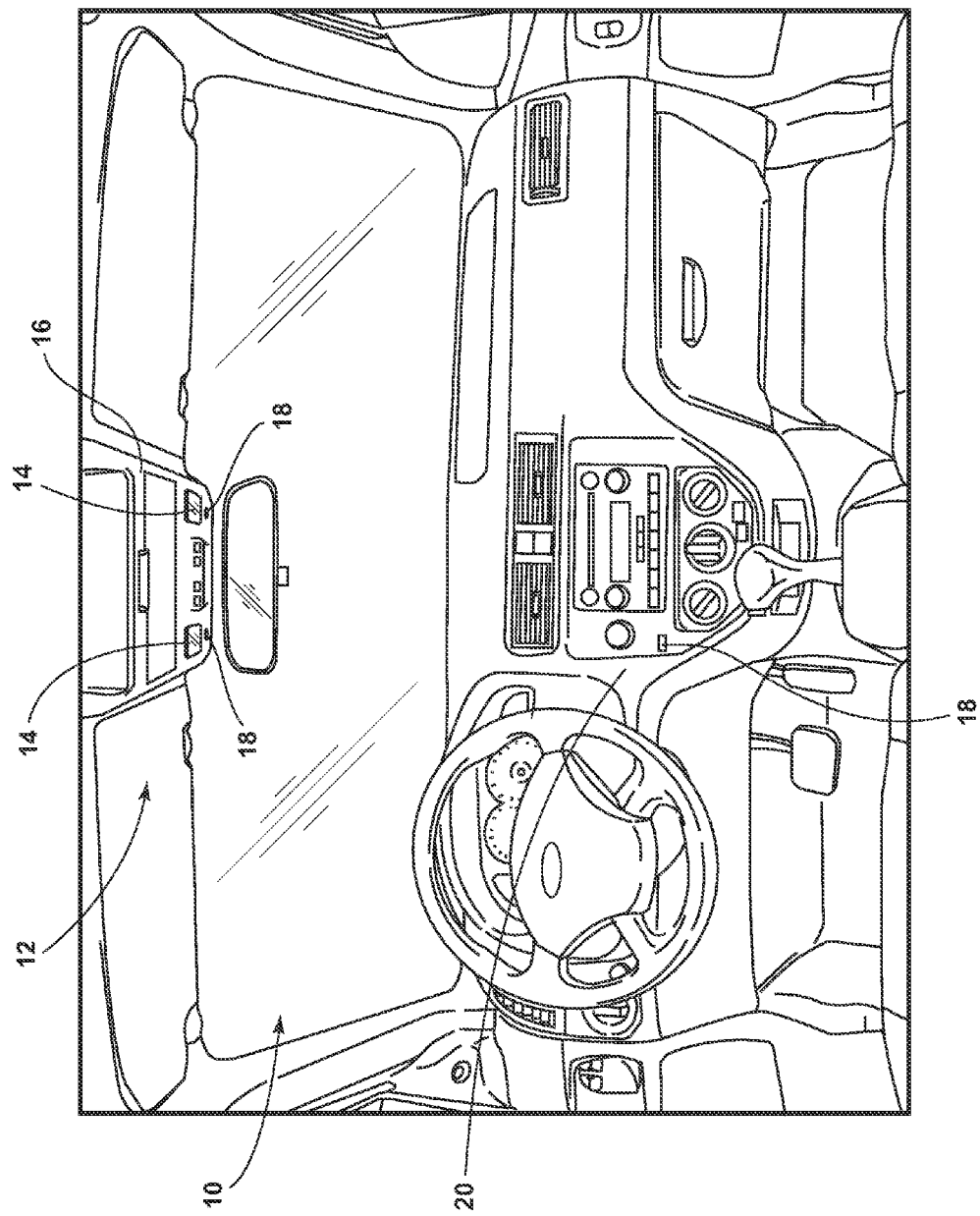
FIG. 1 is a schematic diagram illustrating a front passenger compartment of a vehicle having an overhead console employing two reading lamps, according to one embodiment.

Referring to FIG. 1, the front vehicle passenger compartment 10 of a wheeled vehicle 12 is generally illustrated having at least one reading lamp 14 assembled in an overhead console 16. In the illustrated embodiment, the overhead console 16 is assembled to the interior side of the headliner of the front vehicle passenger compartment 10 and positioned in a central location in the front vehicle passenger compartment 10. As exemplarily shown, two reading lamps 14 are assembled to the overhead console 16, one positioned to provide greater access to a driver of the vehicle 12 and the other positioned to provide greater access to a front vehicle passenger seat occupant. While two reading lamps 14 have been generally shown in FIG. 1, it should be appreciated that one or more reading lamps 14 can be assembled at other locations of the overhead console 16 or other locations on board the vehicle 12. Additionally, one or more switches 18 can be provided to allow a vehicle occupant to manually activate the reading lamps 14. As exemplarily shown, a switch 18 is located proximate to each corresponding reading lamp 14 to allow each reading lamp 14 to be independently controlled. Additionally or alternatively, one or more switches 18 can be located elsewhere on board the vehicle 12, such as the vehicle dash 20, as exemplarily shown in FIG. 1. However, it should be appreciated that the switch 18 can be located in other locations inside the vehicle 12 such as, but not limited to, a driver side door, a passenger side door, and/or a center console area.

Figure 2:
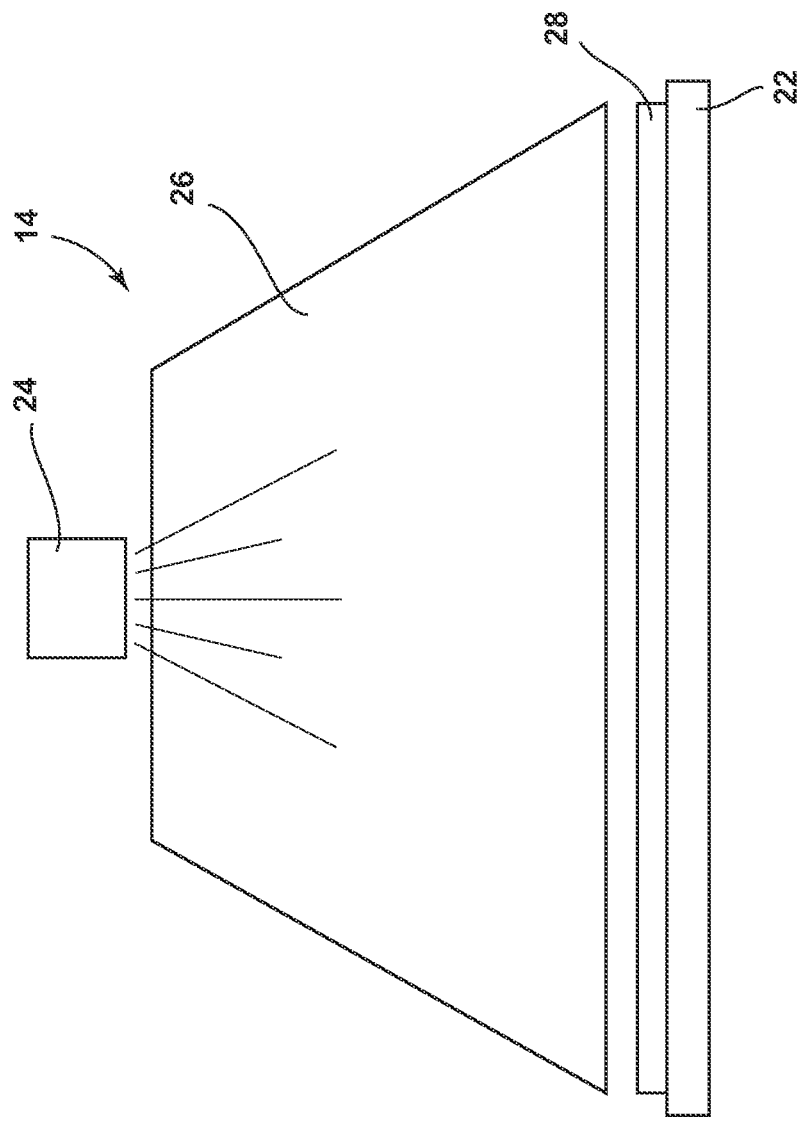
FIG. 2 is a schematic diagram illustrating the reading lamp employing a capacitive sensing configuration, according to one embodiment.

Referring to FIG. 2, a diagram of the reading lamp 14 is shown according to one embodiment. The reading lamp 14 includes an outer lens 22 that is accessible by vehicle occupants and a light source 24 for illuminating the outer lens 22. The light source 24 is generally provided behind the outer lens 22 and can include one or more light emitting diodes (LEDs) to enable the light source 24 to emit one or more types of colored light. To disperse the light emitted from the light source 24, a diffusing optic 26 can be disposed between the light source 24 and the outer lens 22 to provide for an even light distribution across the outer lens 22 when the light source 24 is activated. Activation of the light source 24 can be achieved in a variety of ways. For instance, in one embodiment the outer lens 22 can be implemented in a push configuration, whereby a vehicle occupant presses or pushes the outer lens 22 inward to activate the light source 24. Additionally or alternatively, the light source can be activated via a corresponding switch (e.g. switch 18) on the overhead console 16 and/or on board the vehicle 12, as previously described.

In the illustrated embodiment, a proximity sensor, shown and described herein as capacitive sensor 28 can be provided behind the outer lens 22 and coupled thereto. The capacitive sensor 28 provides a sense activation field that encompasses the outermost surface of the outer lens 22 and can detect capacitive changes resulting from a conductor, such as a vehicle occupant's finger, being within the sense activation field of the capacitive sensor 28 (e.g. touching the outer lens 22). In one embodiment, if the capacitive change meets or exceeds a predetermined threshold level, the light source 24 can be prompted to activate accordingly. While the proximity sensor is shown and described herein as capacitive sensor 28, it should be appreciated that additional or alternative types of proximity sensors can be used for detecting various other signal changes, such as, but not limited to, inductive sensors, optical sensors, temperature sensors, resistive sensors, the like, or a combination thereof.

Figure 3:
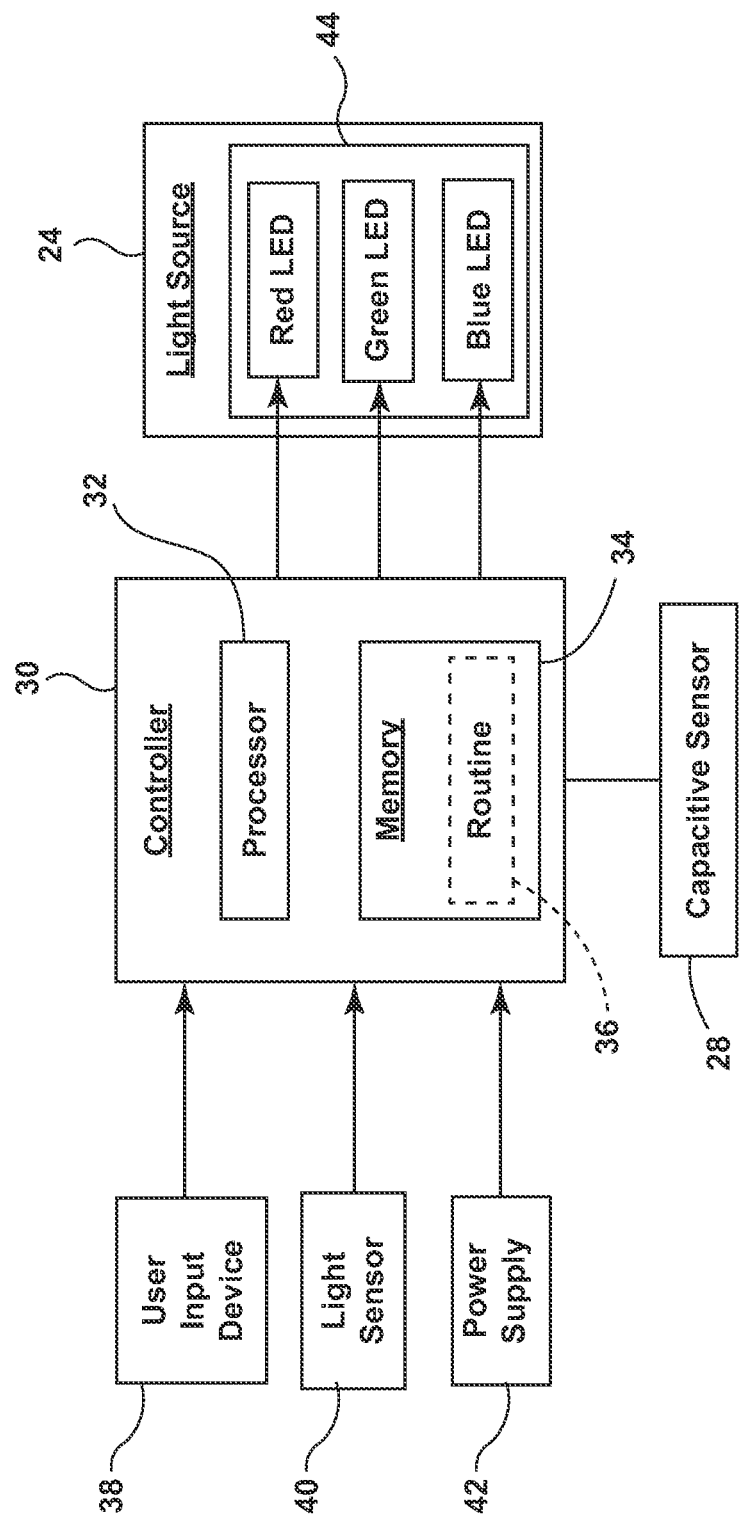
FIG. 3 is a block diagram illustrating a control scheme of the reading lamp according to one embodiment.

Referring to FIG. 3, the reading lamp 14 can further include a controller 30 in electrical communication with the capacitive sensor 28 and the light source 24. In this configuration, when the capacitive sensor 28 detects a change in capacitance, the controller 30 can respond by activating/deactivating the light source 24 accordingly. As shown, the controller 30 can include circuitry such as a processor 32 and controller memory 34. According to one embodiment, a routine 36 for controlling the reading lamp 14 is stored in the memory 34 and is executed by the processor 32. Additionally, the controller 30 can receive input from one or more user input devices 38 (e.g. a switch 18) and/or one or more vehicle equipment, shown as an on board vehicle light sensor 40 configured to detect the presence of a dark condition. To drive the light source 24, the controller 30 can be supplied electrical power from a power supply 42, which can be an on board vehicle power supply or an independent power supply.

The controller 30 is configured to prompt the light source 24 to generate a low intensity light to assist a vehicle occupant in locating the reading lamp 14 in dark conditions. This feature is particularly advantageous to reading lamps 14 employing a push configuration or the capacitive sensing configuration described herein, which both require a vehicle occupant to locate the outer lens 22 and perform an action thereto. Further, the aforementioned feature can be implemented autonomously and/or manually induced. In one embodiment, the controller 30 can receive input from the light sensor 40, indicating the presence of a dark condition, at which point the controller 30 prompts the light source 24 to generate the low intensity light. The low intensity light can be expressed as a faint glow (e.g. ambient lighting) so as to enhance a driving experience without distracting the driver. Additionally or alternatively, the light source 24 can be manually activated using the user input device 38. In any event, by providing a reading lamp 14 equipped with the low intensity light feature, vehicle occupants can visually locate the outer lens 22 in dark conditions when desiring to activate the reading lamp 14 to generate task lighting, in which case the controller 30 prompts the light source 24 to switch from the low intensity light to a high intensity light.

Figure 4:
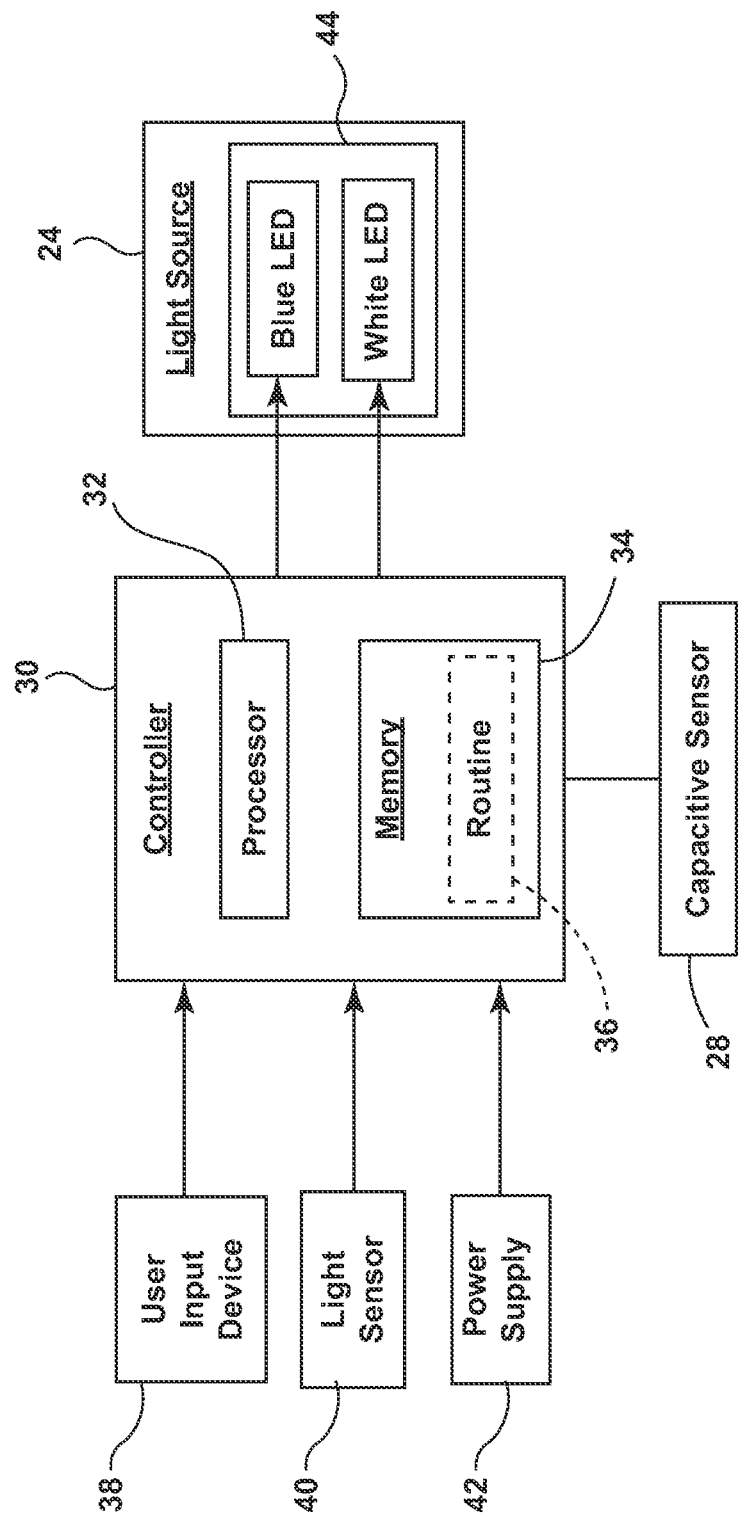
FIG. 4 is a block diagram illustrating the control scheme of the reading lamp, according to another embodiment.

Each light intensity setting can be expressed as a light of the same color or a different color and can be selected by a vehicle occupant using any suitable user input device 38 (e.g. a vehicle center console). Thus, depending on what color options are available, it should be readily apparent that the light source 24 could include one or more LEDs. In one embodiment, the low intensity light is expressed as blue light and the high intensity light can be expressed as white light. As is further shown in FIG. 3, the light source 24 can include an LED package 44 having red, green, and blue light emitting diodes, whereby a blue LED provides the low intensity blue light and a combination of the red, green, and blue LEDs provides the high intensity white light. Alternatively, as shown in FIG. 4, the LED package 44 can have a blue LED for providing the low intensity blue light and a white LED for providing the high intensity white light. In either embodiment, the controller 30 can provide each LED with generated pulse width modulated (PWM) signals to produce the corresponding light intensity and light color. Alternatively, the controller 30 can directly drive the current to each LED to accomplish the same.

Figure 5:
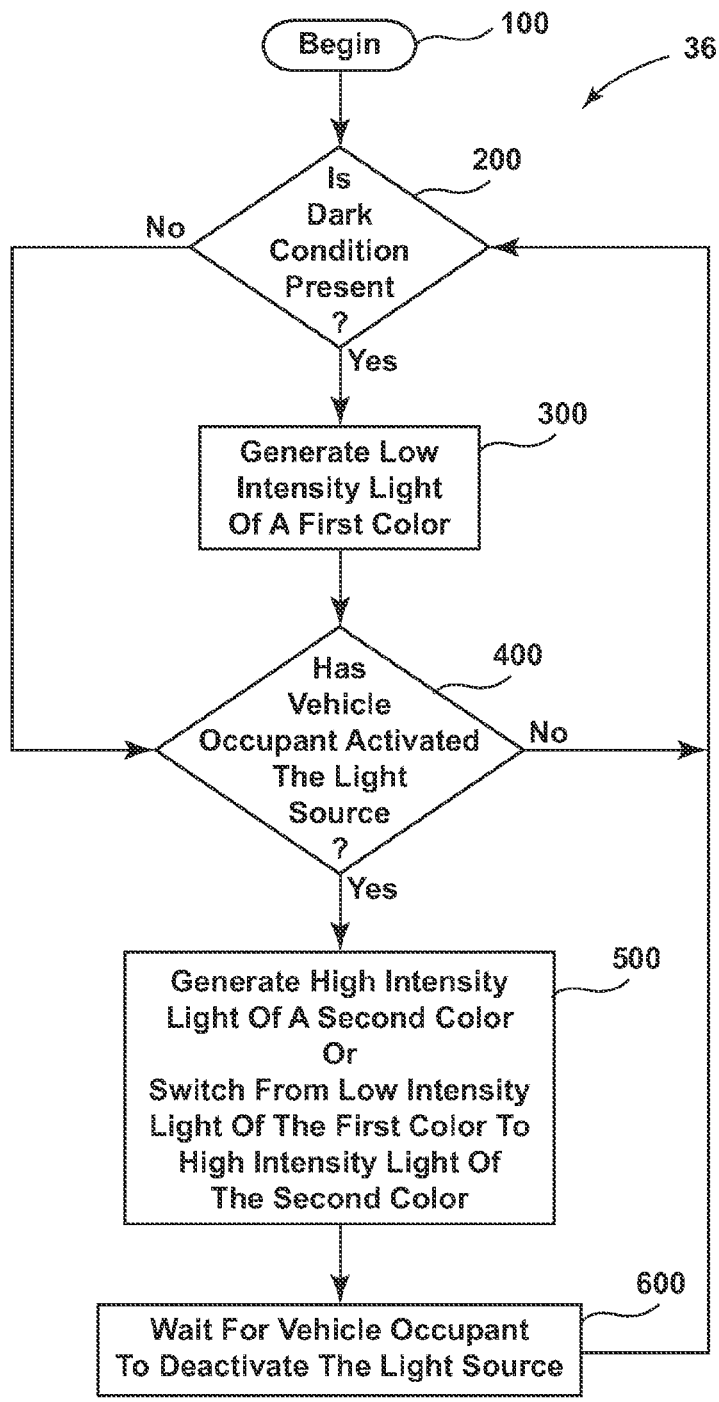
FIG. 5 is a flow diagram illustrating a routine for controlling the reading lamp, according to one embodiment.

Referring to FIG. 5, the routine 36 for controlling the reading lamp 14 is illustrated, according to one embodiment. The routine begins at step 100 and proceeds to step 200 to check if a dark condition is present. As described previously, the controller 30 can receive a signal from the light sensor 40 indicating the presence of a dark condition. If a dark condition is present, the routine 36 proceeds to step 300, where the controller 30 prompts the light source 24 to generate a low intensity light of a first color and the routine 36 proceeds to step 400. If a dark condition is not present, the routine 36 skips step 300 and jumps to step 400. Optionally, step 200 can be manually bypassed using the user input device 38, thereby causing the light source 24 to generate the low intensity light of the first color at the request of a vehicle occupant.

At step 400, the routine 36 checks if a vehicle occupant has activated the light source 24. For a reading lamp 14 employing a capacitive sensing configuration (FIG. 2), activation can occur when a vehicle occupant places a conductor (e.g. the vehicle occupant's finger) in proximity to the capacitive sensor 28, thereby causing a capacitive change to be detected and communicated to the controller 30. Alternatively, for a reading lamp 14 employing a push configuration, activation can occur when a vehicle occupant pushes or presses against the outer lens 22. In either case, if the light source 24 has been activated, the routine 36 proceeds to step 500, where the controller 30 prompts the light source 24 to generate a high intensity light of a second color when step 300 was previously skipped. Alternatively, when step 300 was previously satisfied, the controller 30 prompts the light source 24 to switch from the low intensity light of the first color to the high intensity light of the second color.

Following completion of step 500, the routine 36 proceeds to step 600 and waits for the vehicle occupant to deactivate the light source 24. For example, for a reading lamp 14 employing a push configuration, pushing or pressing against the outer lens 22 a second time will generally deactivate the light source 24. For a reading lamp 14 employing a capacitive sensing configuration, the light source 24 can be deactivated when the capacitive sensor 28 detects a capacitive change while the light source 24 is emitting high intensity light. Once the light source 24 has been deactivated, the routine 36 returns to step 200. With respect to the abovementioned routine 36, it should be appreciated that the first color and the second color can be the same color or a different color and as described previously, the light source 24 can include one or more LEDs depending on the desired color to be emitted therefrom.

Accordingly, a vehicle reading lamp 14 and method of controlling the same has been advantageously provided herein. The reading lamp 14 includes a light source 24 that is capable of being manually or automatically activated to generate a low intensity light to illuminate the outer lens 22 of the reading lamp 14. Thus, for reading lamps 14 that activate as a result of user interaction with the outer lens 22, the faint illumination generated from the light source 24 greatly assists vehicle occupants in visually locating the outer lens 22 in dark conditions. As a result, vehicle occupants desiring task lighting can easily find and activate the reading lamp 14, thereby causing the light output to switch from the low intensity light to a high intensity light. Thus by virtue of providing the low intensity light feature, the vehicle occupant is spared from having to fumble around when attempting to activate the reading lamp 14 at nighttime or when other dark conditions are present.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A reading lamp comprising:
   an outer lens;
   a proximity sensor disposed behind the outer lens;
   a light source for illuminating the outer lens; and
   a controller for activating the light source to generate a low intensity light when a dark condition is detected and a high intensity light when the proximity sensor detects an object being present in a sense activation field encompassing an outermost surface of the outer lens.

2. The reading lamp of claim 1, wherein the light source comprises a plurality of light emitting diodes.

3. The reading lamp of claim 1, wherein the light source comprises a red light emitting diode, a green light emitting diode, and a blue light emitting diode.

4. The reading lamp of claim 1, wherein the light source comprises a white light emitting diode and a blue light emitting diode.

5. The reading lamp of claim 1, wherein the low intensity light is a blue color and the high intensity light is a white color.

6. The reading lamp of claim 1, further comprising a diffusing optic disposed between the light source and the outer lens.

7. The reading lamp of claim 1, wherein the low intensity light is implemented by one of a first pulse width modulation and a first direct drive current and the high intensity light is implemented by one of a second pulse width modulation and a second direct drive current.

8. The reading lamp of claim 1, wherein the controller receives input from a vehicle light sensor indicating the presence of a dark condition.

9. A vehicle reading lamp, comprising:
   an outer lens;
   a capacitive sensor having a sense activation field that encompasses an outermost surface of the outer lens;
   a light source for illuminating an outer lens; and
   a controller for activating the light source to generate a low intensity light when a vehicle light sensor indicates the presence of a dark condition, wherein when the capacitive sensor detects a capacitive change resulting from a conductor being within the sense activation field, the controller prompts the light source to switch from the low intensity light to a high intensity light.

10. The reading lamp of claim 9, wherein the light source comprises a first light emitting diode for providing the low intensity light and a second light emitting diode for providing the high intensity light.

11. The reading lamp of claim 9, wherein the light source comprises a blue light emitting diode for providing the low intensity light and a white light emitting diode for providing the high intensity light.

12. The reading lamp of claim 9, wherein the light source comprises a red light emitting diode, a green light emitting diode, and a blue light emitting diode, wherein the low intensity light is provided by the blue light emitting diode and the high intensity light is provided by the red, green, and blue light emitting diodes and is expressed as a color mixture of red, green, and blue light.

13. The reading lamp of claim 9, wherein the low intensity light is implemented by one of a first pulse width modulation and a first direct drive current and the high intensity light is implemented by one of a second pulse width modulation and a second direct drive current.

14. A method of controlling a vehicle reading lamp, comprising the steps of:
    providing a proximity sensor behind an outer lens;
    activating a light source to generate a low intensity light upon detecting a dark condition; and
    prompting the light source to switch from the low intensity light to a high intensity light when the proximity sensor detects an object being present in a sense activation field that encompasses an outermost surface of the outer lens.

15. The method of claim 14, wherein the step of activating the light source to generate a low intensity light is autonomously implemented using a controller in communication with the light source.

16. The method of claim 14, wherein the step of activating the light source to generate a low intensity light comprises the step of expressing the low intensity light as light of a first color.

17. The method of claim 16, wherein the step of prompting the light source to switch to a high intensity light comprises the step of expressing the high intensity light as light of a second color, wherein the second color is different from the first color.

18. The method of claim 14, wherein the indication that a dark condition is present is provided by a vehicle light sensor.

* * * * *